(12) United States Patent
Kotlaba et al.

(10) Patent No.: US 10,802,794 B2
(45) Date of Patent: Oct. 13, 2020

(54) AVALANCHE TRANSCEIVER AND METHOD FOR OPERATING AN AVALANCHE TRANSCEIVER

(71) Applicant: Ortovox Sportartikel GmbH, Taufkirchen (DE)

(72) Inventors: Dieter Kotlaba, Wolfratshausen (DE); Philipp Monden, Munich (DE); Rolf Matzner, Munich (DE)

(73) Assignee: Ortovox Sportartikel GmbH, Taufkirchen (DE)

(*) Notice: Subject to any disclaimer, the term of this patent is extended or adjusted under 35 U.S.C. 154(b) by 134 days.

(21) Appl. No.: 16/155,747

(22) Filed: Oct. 9, 2018

(65) Prior Publication Data

US 2019/0107996 A1 Apr. 11, 2019

(30) Foreign Application Priority Data

Oct. 9, 2017 (EP) ..................................... 17195429

(51) Int. Cl.

| | |
|---|---|
| *G06F 3/16* | (2006.01) |
| *H04B 17/318* | (2015.01) |
| *H04B 1/38* | (2015.01) |
| *A63B 29/02* | (2006.01) |
| *A63B 71/06* | (2006.01) |
| *G08B 21/02* | (2006.01) |

(52) U.S. Cl.
CPC ............ *G06F 3/167* (2013.01); *A63B 29/021* (2013.01); *H04B 1/38* (2013.01); *H04B 17/318* (2015.01); *A63B 2071/063* (2013.01); *A63B 2071/0625* (2013.01); *G08B 21/0263* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,484,021 B1* | 11/2002 | Hereford | ............... | A63B 29/021 |
| | | | | 455/404.1 |
| 9,613,623 B2* | 4/2017 | Kang | ....................... | G10L 15/22 |
| 2003/0218539 A1* | 11/2003 | Hight | ................. | G08B 21/0266 |
| | | | | 340/539.13 |
| 2006/0148423 A1 | 7/2006 | Sharpe | | |
| 2009/0163150 A1* | 6/2009 | Kampel | ............... | A63B 29/021 |
| | | | | 455/90.1 |

(Continued)

FOREIGN PATENT DOCUMENTS

| | | | | |
|---|---|---|---|---|
| CA | 2443751 A1 * | 4/2005 | ............... | G01S 3/30 |
| DE | 29922217 U1 | 2/2000 | | |

(Continued)

*Primary Examiner* — Mohammad K Islam
(74) *Attorney, Agent, or Firm* — Bradley Arant Boult Cummings; Timothy L. Capria (57) ABSTRACT

The invention relates to an avalanche transceiver, having a transmitting unit for transmitting at least one transmit signal, a receiving unit for receiving at least one transmit signal from at least one further avalanche transceiver, and a control device for controlling at least one loudspeaker. The control device is designed to control the at least one loudspeaker to output at least one voice message on the basis of at least one event. The at least one event is associated with a search for the at least one further avalanche transceiver. The invention further relates to a method for operating such an avalanche transceiver.

15 Claims, 8 Drawing Sheets

(56) References Cited

U.S. PATENT DOCUMENTS

| | | | | |
|---|---|---|---|---|
| 2013/0080178 A1* | 3/2013 | Kang | ................... | G06F 3/167 |
| | | | | 704/275 |
| 2015/0099472 A1* | 4/2015 | Ickovic | ............... | H04W 64/006 |
| | | | | 455/66.1 |
| 2017/0064504 A1* | 3/2017 | Jose | ..................... | H04W 4/023 |
| 2017/0064643 A1* | 3/2017 | Braun | ................... | H04W 52/14 |
| 2017/0366569 A1* | 12/2017 | Wilson | ................ | H04L 63/1416 |

FOREIGN PATENT DOCUMENTS

| | | | | |
|---|---|---|---|---|
| EP | 0855600 A2 * | 7/1998 | ............. | G01S 3/043 |
| WO | 2006015721 A1 | 2/2006 | | |

\* cited by examiner

AVALANCHE TRANSCEIVER AND METHOD FOR OPERATING AN AVALANCHE TRANSCEIVER

This application is a nonprovisional patent application filed by applicant Ortovox Sportartikel GmbH for the invention by Dieter Kotlaba, a citizen of Germany, residing in Wolfratshausen, Germany, Philipp Monden, a citizen of Germany, residing in Munchen, Germany, and Dr. Rolf Matzner, a citizen of Germany, residing in Munchen, entitled, "AVALANCHE TRANSCEIVER AND METHOD FOR OPERATING AN AVALANCHE TRANSCEIVER." This application claims priority to European Patent Application Number 17195429.0, filed on Oct. 9, 2017.

TECHNICAL FIELD

The invention relates to an avalanche transceiver, having a transmitting unit for transmitting at least one transmit signal, a receiving unit for receiving at least one transmit signal from at least one further avalanche transceiver, and a control device for controlling at least one loudspeaker. The invention further relates to a method for operating such an avalanche transceiver.

BACKGROUND

US 2006/0148423 A1 describes an avalanche transceiver with a display, on which, once the avalanche transceiver is in a search mode, arrows indicate, in which direction a searching person is supposed to move in order to find a transmitting avalanche transceiver. The display also shows the distance from the transmitting transceiver. In addition, the avalanche transceiver has a loudspeaker which, in search mode, transmits an audio signal. Said audio signal becomes louder, when the searching avalanche transceiver closes in on the transmitting avalanche transceiver.

However, it is disadvantageous that despite the indications for the search shown on the display as well as the audio signal, the search for the transmitting avalanche transceiver proves difficult. The searching person who searches for the buried carrier of the transmitting avalanche transceiver is particularly in a stress situation, and the observation of the indications shown on the display and the audio signal pose a significant challenge.

The present invention thus addresses the problem of creating an avalanche transceiver of the initially described type, which simplifies the search for a transmitting avalanche transceiver.

BRIEF SUMMARY

Further advantages, features, and details of the invention can be gathered from the claims, the description of preferred embodiments below, as well as the drawings. The avalanche transceiver according to the invention has a transmitting unit for transmitting at least one transmit signal, and a receiving unit for receiving at least one transmit signal transmitted from at least one further avalanche transceiver. The avalanche transceiver has a control device for controlling at least one loudspeaker. The control device is designed to control the at least one loudspeaker to output at least one voice message on the basis of at least one event. Hereby, the at least one event is associated with a search for the at least one further avalanche transceiver. The search for the further or transmitting avalanche transceiver can thus be supported by the outputting of the at least one voice message. This simplifies the search for the transmitting avalanche transceiver.

In particular, it is thus possible to give a user of the avalanche transceiver set to search mode indications in the form of the at least one voice message to change said user's search strategy or the type of search or to adjust the strategy to the situation of the search. As a result, the search for the transmitting or further avalanche transceiver can be made particularly fast and reliable. The control device is also designed to take into account the at least one event which is associated with the search for the at least one further or transmitting avalanche transceiver. As a result, the search for the at least one further avalanche transceiver can be supported particularly efficiently by the emission of the at least one voice message.

In the following and for reasons of simplification, the searching avalanche transceiver or the avalanche transceiver receiving the at least one transmit signal shall also be called the "searching transceiver" or the "receiving transceiver," and the at least one further avalanche transceiver outputting the at least one transmit signal shall also be called the "further transceiver" or the "transmitting transceiver" or the "buried transceiver."

With the control device taking into account the at least one event, it is possible to divide or classify the search for the transmitting transceiver into different states or search states. In particular, an event in the form of a change of state can be used as a trigger for a voice output or an emission of the voice message.

In particular, it can be provided that the control device is designed to subsequently control the at least one loudspeaker to output the at least one voice message, when the receiving unit and/or the control device detects a change of at least one parameter associated with the search. With the emission of the voice message or the transmission of a corresponding voice output to the user of the receiving transceiver, it is thus possible to react particularly well to a change of the situation of the search.

Preferably, the control device is designed to control the at least one loudspeaker to output the at least one voice message, when the receiving unit detects a change of a received strength and/or a received quality of the transmit signal of the further avalanche transceiver. As a result, the search can be adjusted well to the currently present conditions. For example, the user of the receiving or searching transceiver can initially be prompted in the course of a signal search to search an avalanche cone with a specific search strip width as long as the received strength and/or quality of the transmit signal are not yet sufficient to localize the transmitting transceiver. However, once the received transmit signal is sufficient to allow for a stable target guidance, a corresponding voice message can be output.

The user of the receiving transceiver can subsequently be notified that a transmitter was detected, and that the user of the receiving transceiver, for example, is supposed to run straight ahead, or to the right, or to the left. Thus, corresponding voice messages can be, for example: "Transmitter detected," "Run straight ahead," "Run to the right," or "Run to the left."

Furthermore, it is possible that the transmit signals of at least two transmitting or buried transceivers overlap and at least partially cancel each other out. This can also become noticeable by a change of a strength and/or a quality of the received transmit signal. Subsequently, a voice message that such a signal overlap is present and the user of the receiving transceiver is supposed to keep running can be output for the user of the searching or receiving transceiver. A corresponding voice message or voice output or a command can be: "Signal overlap. Keep running."

It is also possible that external sources of interference, such as electronic, magnetic, or metallic objects, impair the quality of the receiving transmit signal. Such sources of interference, such as smartphones, cameras, radio devices, GPS devices, power lines, radio masts, and the like can be the cause for the purposeful decrease of the sensitivity of the searching transceiver by means of the control device. In such case, the searching person can be prompted by means of the voice message to search the avalanche cone with a reduced search strip width.

For example, if there are no or hardly any external sources of interference, the user of the searching transceiver can search the avalanche cone in search strips which have a width from approximately 50 meters to approximately 60 meters. In case of the reduced range of the receiving or searching transceiver, the user can in contrast be prompted via voice message to search the avalanche cone with a search strip width from approximately 25 meters to approximately 30 meters.

It is further advantageous if the control device is designed to control the at least one loudspeaker to output the at least one voice message, when the receiving unit detects a change of direction, from which the transmit signal of the further avalanche transceiver originates. As a result, the searching person can be prompted by the voice message, for example, to no longer run straight ahead but to run to the right or run to the left. This also simplifies or improves the search for the transmitting or buried transceiver.

The avalanche transceiver can particularly be designed to send transmit signals at different frequencies, wherein the receiving unit is designed to receive the transmit signals transmitted at the different frequencies. As a result, one of the frequencies can be used to transmit further data associated with the search for the buried or transmitting transceiver. For example, on the further frequency, position data of the transmitting transceiver and/or an orientation of at least one transmitting antenna of the transmitting transceiver can be transmitted. As a result, a direct search on the shortest path to the buried person can be conducted in an improved manner. Therefore, if the quality of the at least one transmit signal allows for a linking of the data transmitted at different frequencies, such a direct search can be initiated. A transition from a conventional coarse search, during which a searching person is supposed to run roughly and quickly in the direction, from which the transmit signal originates, to a direct coarse search or direct search can also be communicated to the user of the receiving transceiver in the form of the at least one voice message, for example, with a voice message, such as "Direct search active."

Preferably, the control device is designed to estimate a distance from the further avalanche transceiver by evaluating the transmit signal received by the receiving unit, and to subsequently control the at least one loudspeaker to output the at least one voice message, when the distance is shorter than a predefined threshold value. As a result, the user of the receiving transceiver can be informed, for example, that said user is supposed to transition from a coarse search to a fine search.

For example, the user can be instructed by the voice message to hold the receiving transceiver close to the snow surface of the avalanche cone. Such a voice message or such a command can be, for example: "Go down to the snow surface."

Particularly at an even shorter distance from the further or transmitting transceiver, the user of the receiving transceiver can be instructed by a voice message that the area, in which the transmitting transceiver is located, is now supposed to be searched in a cross pattern and with the transceiver held closely to the snow surface. For example, such a voice message or such a command can be: "Search for the smallest value in a cross pattern."

In such a fine search, the receiving transmitter is moved consecutively along two rectangularly intersecting lines, until a lowest distance value is displayed on a display unit, particularly a display unit of the transceiver, in the direction of the corresponding line. The point, at which the lines intersect, can subsequently be marked with an object. Then, the buried person can be freed at this location.

In particular, if a distance falls below approximately 6 meters, the user of the searching transceiver can be prompted to bring the transceiver closer to the snow surface, and if a distance falls below approximately 3 meters, said user can be prompted to conduct the search in a cross pattern. Due to such a detection of a change of the distance as the at least one event, and the outputting of the at least on voice message on the basis thereof, the search can be conducted very target-oriented and quickly.

The control device can furthermore be designed to estimate a distance from the further avalanche transceiver by evaluating the transmit signal received by the receiving unit, and to subsequently control the at least one loudspeaker to output the at least one voice message, when an increase of the distance is greater than a predefined threshold value. Particularly during the fine search, the user of the searching transceiver can thus be notified that said user had already been closer to the transmitting transceiver. A voice message, such as "You have already been closer" can be output, for example, when the value of the distance, particularly the value displayed on the display unit, indicated during the fine search becomes greater by a predefined threshold value from approximately 0.5 meters to approximately 1.0 meter, particularly by approximately 0.5 meters, than the smallest value of the distance already determined during the fine search. This results in a very precise search.

It has further proven advantageous if the control device, by evaluating the transmit signal received by the receiving unit, is designed to estimate a speed, with which a distance from the further avalanche transceiver changes, particularly decreases, and to subsequently control the at least one loudspeaker to output the at least one voice message, when the speed is greater than a predefined first threshold value. As a result, the user of the searching transceiver can be prompted to walk slower. This is advantageous particularly prior to the transition from the coarse search to the fine search, i.e., for example, in a value range of the distance from approximately 11 meters to approximately 8 meters. The corresponding voice message, which, for example, can be output at a search speed of more than 1 meter per second, can be, for example: "Walk slower." This is beneficial for an efficient search for the transmitting transceiver.

Preferably, the control device is further designed, by evaluating the transmit signal received by the receiving unit, to estimate a speed, with which a distance from the further avalanche transceiver changes, particularly decreases, and to subsequently control the at least one loudspeaker to output the at least one voice message, when the speed is lower than a predefined second threshold value. Particularly during the coarse search, the user of the searching transceiver can be prompted to walk faster, for example, by a voice message, such as: "Walk faster." This ensures that the position, at which the transmitting transceiver is located, will be reached as quickly as possible.

Preferably, the control device is designed to take into account as the at least one event, whether the avalanche transceiver can be located using the transmit signal received by the receiving unit. As a result, the user of the receiving transceiver can be prompted by means of the at least one voice message, for example, to conduct a signal search, with which the avalanche cone is supposed to be searched with a specific search strip width. If the further or transmitting transceiver can then be located with sufficient accuracy, the user of the receiving transceiver can be informed that a transmitter was detected, and, proceeding from the searching or receiving transceiver, that it is located in a specific direction. By running in said direction, the user of the receiving transceiver can approach the transmitting or buried transceiver. As a result, a particularly quick and efficient search can be realized.

It is further advantageous if the control device is designed to take into account as the at least one event, whether the avalanche transceiver is set in a search mode or a mode different from the search mode. For example, the search mode can be set by actuating an operating element, such as a switch of the transceiver, particularly by throwing or rotating the switch to a specific position. Subsequently, it is possible to output as the voice message that the search mode is active, for example, with the voice message "Search activated." However, if the switch is moved back to its initial position, the user can be informed via the voice message that a transmission mode of the avalanche transceiver is active, for example, with the voice message "Transmission activated."

In addition, it is possible to activate a further mode, which is different from the search mode, by actuating at least one operating element, such as a button and/or a switch. For example, after the actuation of a button, which is detected by the control device, the user of the transceiver can be informed that the transceiver is now in a standby mode, for example, with the voice message "Standby activated." In such a standby mode, the transceiver does not transmit, and so a searching transceiver located close by is not interrupted. For example, said standby mode can be set, when a helper frees a buried person but does currently not participate in the search for a further buried person. In particular, it can be provided that after expiration of a specific interval, during which the transceiver put in the standby mode is not moved, the control device switches the transceiver from the standby mode back to the transmission mode. This, for example, can be meaningful if said helper is buried by a secondary avalanche.

By actuating at least one operating element, e.g., by actuating a switch and/or a button, a group check mode can additionally be activated, in which the transceivers of a group are subsequently tested, whether they function flawlessly. The setting of such a group check mode can also be verified by outputting the voice message, for example, with the voice message "Group check activated."

Preferably, the control device is designed to control the at least one loudspeaker to output the at least one voice message if, over a predefined number of successive transmit signals of the further avalanche transceiver, a search direction selected by a user of the avalanche transceiver deviates by more than a predefined extent from a search direction to be selected. As a result, the search can be corrected, if necessary, e.g. with voice messages or commands, such as "Keep to the right" or "Keep to the left."

However, in order to ensure that even smaller deviations of the actual search direction from the search direction to be selected do not result in the outputting of voice messages which would subsequently change frequently, such a correction is preferably only made, when the deviation is significant, e.g. because the actual search direction deviated several times in a row by more than the predefined extent from the search direction to be selected. As a result, the search can be improved or simplified with easy-to-follow and user-supporting voice messages without confusing the user of the receiving transceiver.

Analogously, the control device can be designed to control the at least one loudspeaker to output the at least one voice message if, over a predefined number of successive transmit signals of the further avalanche transceiver, a received strength of the transmit signal of the further avalanche transceiver decreases by a predefined extent. In such case, it can be assumed that the user of the receiving transceiver moves away from the transmitting transceiver. A subsequently output voice message can be: "You are moving away. Turn around." Once again, the voice message prompting the user to turn around is not output after each decrease of the measured strength of the transmit signal but only, when the strength of the transmit signal decreases over a predefined number of successive transmit signals. As a result, incorrect or superfluous voice outputs can be prevented.

Preferably, the control device is designed to take into account as the at least one event at least one operating entry of a user of the avalanche transceiver. For example, after finding a location, at which a buried transmitting transceiver is located, the respective location can be marked, and so it is possible to begin with the sounding or shoveling at this location. While a further helper performs such activities, a further buried transmitter can be searched by means of the searching or receiving transceiver. By means of the operating entry, it is thus possible, for example, to inform the control device that the search for a transmitting transceiver is completed. For that purpose, for example, an operating button can be pressed. A text, such as "Transmitter marked," can be output as corresponding voice message. In addition, the user of the receiving transceiver can be informed that a further transmitter was detected, i.e. a further avalanche transceiver, which transmits a transmit signal. A corresponding voice message can be: "New transmitter detected."

It has further proven advantageous if the control device is designed to take into account as the at least one event a handling of the avalanche transceiver by the user. For example, a signal of an inclination sensor of the receiving transceiver can be evaluated in order to determine that the searching transceiver is not held sufficiently horizontally. From the presence of such an incorrect handling, the control device in particular can deduce if this unfavorable handling of the transceiver lasts longer than a predefined interval from, for example, approximately 2 seconds to approximately 10 seconds, particularly longer than 5 seconds. The user can subsequently be provided with a voice message, such as "Hold the hand horizontally."

Analogously, the user can be informed about an overly unsteady handling of the avalanche transceiver. For that purpose, speeds, particularly angular speeds, occurring during the movement of the receiving transceiver can be measured and the measurements can be evaluated by the control device. If the control device determines that the transceiver is accelerated too wildly, it can inform the user of said transceiver about this incorrect handling of the transceiver by means of a voice message, such as "Keep the hand steadier." Such corrections of the handling of the avalanche transceiver facilitate a quick, purposeful search by means of the receiving transceiver.

Preferably, the avalanche transceiver has a memory, in which a multiplicity of voice messages in a multiplicity of languages is stored. For example, voice files or audio files set up in respective languages, which can be output via a loudspeaker of the avalanche transceiver, can be stored in the memory. By setting the language during the configuration of the avalanche transceiver, it can thus be very easily specified, in what desired output language the voice messages are supposed to be communicated to the user of the searching transceiver. Such a voice output in different languages can be particularly easily realized.

It can further be provided that the avalanche transceiver has a memory, in which a multiplicity of predetermined texts is stored. Based on such texts, predetermined voice messages can be particularly easily generated.

Preferably, the avalanche transceiver has a conversion device, by means of which a respective text can be converted into the at least one voice message. Generating the voice message or the voice command is then based on the corresponding text. The conversion device can thus be designed for speech synthesis, e.g. by means of a text-to-speech software and/or a text-to-speech firmware. Such a software or firmware converts a text into an acoustic voice output. As a result, further voice messages can be generated, if needed, e.g. by storing further texts in the memory which subsequently can be transformed or converted by means of the conversion device.

In particular, it can be provided that the predetermined texts are available in the memory in a multiplicity of languages. As a result, the text already present in the desired language only has to be converted into the voice message by means of the conversion device. This particularly simplifies the outputting of the voice message in the desired language.

Additionally or alternatively, it can be provided that, by means of the conversion device, the respective text can be output in a multiplicity of languages. It can thus also be particularly ensured that the voice message is easily comprehensible for the respective user. A desired output language can be set, for example, during the configuration of the avalanche transceiver.

The at least one loudspeaker can be integrated in a device different from the avalanche transceiver, for example, in a mobile terminal, such as a smartphone or the like and/or in a helmet of a user of the avalanche transceiver. In that case, the avalanche transceiver is particularly compact. In addition, during the search, the loudspeaker can be placed or remain close to the ear of the searching person.

Additionally or alternatively, the avalanche transceiver can have the at least one loudspeaker. As a result, the controlling of the loudspeaker by means of the control device of the avalanche transceiver can be realized very easily and functionally reliably.

A display unit for displaying indications for the search for the at least one further avalanche transceiver can also be integrated in the device different from the avalanche transceiver, e.g. in a mobile terminal, particularly in a smartphone or the like. As a result, the search for the transmitting transceiver can be facilitated by means of such a device.

Preferably, the avalanche transceiver has a display unit, which is controllable by means of the control device and is used to display indications for the search for the at least one further avalanche transceiver. As a result, the search for the transmitting transceiver facilitated by the outputting of the voice messages can be additionally supported by the indications on the display of the transceiver, and the search is conducted particularly purposefully and quickly.

Preferably, the at least one loudspeaker is designed to output at least one audio signal which is associated with the search for the at least one further avalanche transceiver. For example, bleeps, which change with regard to the frequency and/or the repetition rate and/or the volume, can be output as audio signals from the at least one loudspeaker. For example, the frequency of the individual bleep and the repetition rate of the bleeps and their volume can increase, the more the searching transceiver closes in on the transmitting transceiver. In this manner, the search for the transmitting or buried transceiver is further supported.

For that purpose, it has proven advantageous if the control device is designed to control the at least one loudspeaker such that the at least one audio signal is suppressed or output with a reduced volume, when the at least one voice message is output. As a result, no audio signals, such as bleeps, interfere with the audibility of the voice messages. In turn, this facilitates the search for the transmitting transceiver which is supported by the at least one audio signal.

It has proven advantageous if the control device is designed to control the display unit on the basis of the at least one voice message. For example, a change of indications shown on the display unit can temporally be accompanied by the outputting of the voice message. As a result, particularly a change of the search strategy to be made by the user of the receiving transceiver, e.g. a transition from the signal search to the coarse search or from the coarse search to the fine search, can be illustrated particularly well. This is also beneficial for quickly finding the transmitting transceiver.

In particular, the control device can be designed to effect the output of the at least one voice message by means of the at least one loudspeaker in a predefined temporal relationship to the display on the display unit of at least one indication for the search for the at least one further avalanche transceiver. For example, the at least one indication on the display unit can be shown during the outputting of the voice message. Preferred is a display of the indication within a narrow time frame relative to the outputting of the voice message. The voice message can already have been started, when the indication is displayed, or the indication can already be displayed shortly before the voice message is output. With such a direct, particularly simultaneous controlling of the display unit and the loudspeaker, it is possible to indicate particularly well to the user of the searching transceiver, how to proceed with the search for the transmitting transceiver.

Furthermore, a change of indications on the display or the display unit can take place without being accompanied by a voice message. In addition, a voice message can also be output, even if the display of contents or indications on the display unit remains unchanged.

With the method according to the invention for operating an avalanche transceiver, having a transmitting unit for transmitting at least one transmit signal, and a receiving unit for receiving at least one transmit signal output by the at least one further avalanche transceiver, at least one loudspeaker is controlled by a control device of the avalanche transceiver. The control device controls the at least one loudspeaker such that the at least one loudspeaker outputs at least one voice message. The at least one loudspeaker is controlled by the control device on the basis of at least one event which is associated with a search for the at least one further avalanche transceiver. The avalanche transceiver according to the invention for executing the method according to the invention is designed accordingly, which simplifies the search for the transmitting or further avalanche transceiver.

The advantages and preferred embodiments described for the avalanche transceiver according to the invention also apply to the method according to the invention, and vice versa.

DETAILED DESCRIPTION

The features and combinations of features referred to above in the description and the features and combinations of features referred to in the following description of the drawings and/or shown solely in the drawings are useable not only in each of the combinations described but also in other combinations or in isolation without exceeding the scope of the invention. Therefore, embodiments and combinations of features, which do not contain all the features of the originally worded independent claim, are also to be considered disclosed. In addition, embodiments and combinations of features which exceed or deviate from the combinations of features referred to in the dependency references of the claims, are also to be considered disclosed, particularly by the above described embodiments.

Further advantages, features, and details of the invention can be derived from the claims, the following description of preferred embodiments, and from the drawings.

Figure 1:
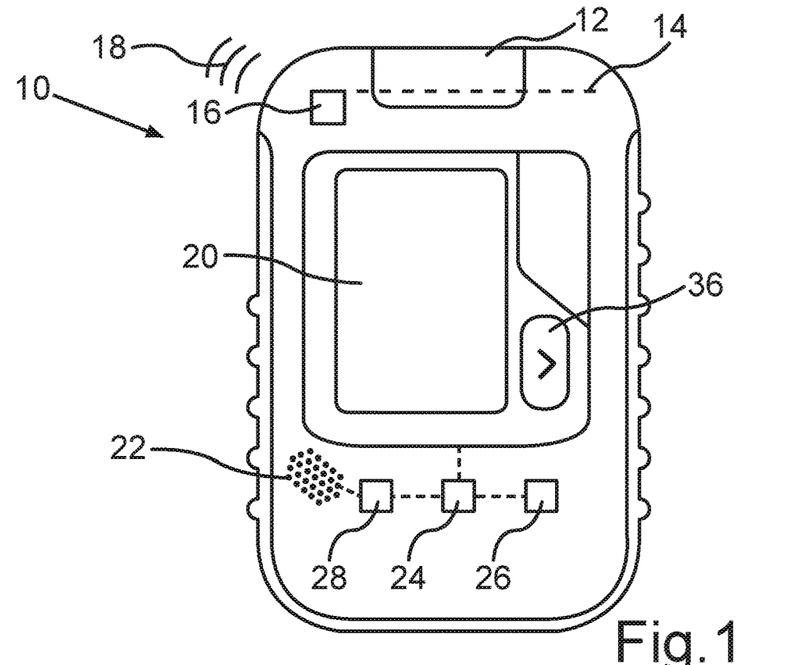
FIG. 1 FIG. 1 shows a schematic front view of an avalanche transceiver in a transmission mode.
Figure 2:
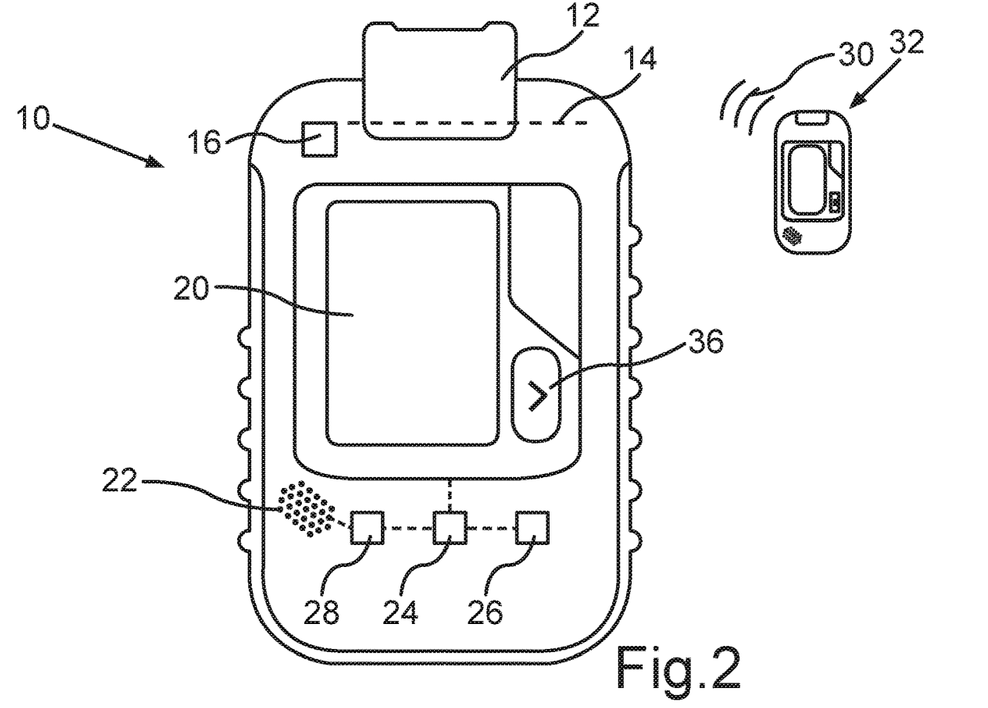
FIG. 2 shows the avalanche transceiver according to FIG. 1, which is in a search mode and receives a transmit signal from a further avalanche transceiver.

FIG. 1 shows schematically and a front view of an avalanche transceiver 10 which is in a transmission mode. Correspondingly, an operating element in the form of a switch 12, which is pivotable around a pivot axis 14 from the position shown in FIG. 1 to the position of the switch shown in FIG. 2, is in a normal position or an initial position. A transmitting and receiving unit 16 of the avalanche transceiver 10 thus functions as a transmitting unit and outputs a transmit signal 18 schematically shown in FIG. 1. The transmit signal 18 can be received by a further avalanche transceiver which is in search mode. The transmitting and receiving unit 16 can comprise a multiplicity of antennas, particularly three antennas orthogonally aligned to one another, which in the transmission mode (cf. FIG. 1) serve as transmitting antennas and in the receiving mode (cf. FIG. 2) as receiving antennas.

The avalanche transceiver 10 further has a display unit or a display 20 and a loudspeaker 22. A control device 24 controls the display 20 and the loudspeaker 22. In the present case, voice messages can be output via the loudspeaker 22, when it is controlled correspondingly by the control device 24. For that purpose, the avalanche transceiver 10 has a memory 26, in which texts and/or the voice messages are stored. Particularly, if texts are stored in the memory 26, the texts stored in the memory 26 can be transformed or converted into corresponding voice messages by means of a conversion device 28 in order to simplify or facilitate the search for a transmitting avalanche transceiver 10 (cf. FIG. 1). In particular, the voice messages can furthermore be stored as voice files in the memory 26 in a multiplicity of languages, wherein an output language of the avalanche transceiver 10 can preferably be preset during the configuration of said avalanche transceiver 10. The conversion device 28 and/or the memory 26 can be integrated in the control device 24 or designed as corresponding components of the control device 24.

Using FIG. 2, a situation is supposed to be illustrated, in which the avalanche transceiver 10 was placed into a search mode by moving, particularly pivoting or rotating the switch 12 around the pivot axis 14. Correspondingly, the transmitting and receiving unit 16 subsequently serves as a receiving unit for receiving a transmit signal 30 which is transmitted by a further avalanche transceiver 32. The further avalanche transceiver 32 shown only schematically in the present case can be designed to be structurally identical with the avalanche transceiver 10 shown in FIG. 1. In order to determine, whether the avalanche transceiver 10 is in the transmission mode (cf. FIG. 1) or in the search mode (cf. FIG. 2), the control device 24 can evaluate a position of the switch 12. On the basis of such an evaluation, the control device 24 can subsequently control the loudspeaker 22, and so said loudspeaker 22 outputs a voice message, such as "Transmission activated" (cf. FIG. 1) or "Search activated" (cf. FIG. 2). In the transmission mode of the avalanche transceiver 10, a corresponding symbol, which illustrates the transmission mode, can be displayed on the display 20.

Figure 3:
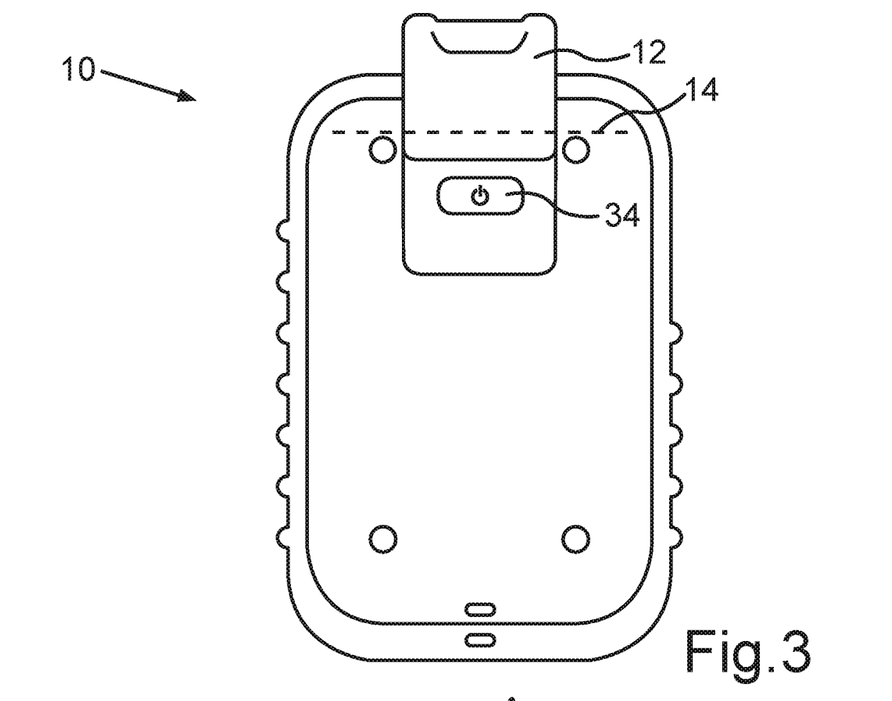
FIG. 3 shows a rear view of the avalanche transceiver according to FIG. 2.

From the rear view of the avalanche transceiver 10 in search mode (cf. FIG. 2) shown in FIG. 3, it can be seen that a further switch 34 for activating and deactivating can be arranged on the rear side of the avalanche transceiver 10. By means of said switch 34, the avalanche transceiver 10 can be put into operation or deactivated. For confirming the deactivation, it can be required to actuate a further button 36 which in the present case is arranged on the front side of the avalanche transceiver 10 next to the display 20.

The view in FIG. 4 again shows the switch 12 in its transmitting position, wherein a cover 38 in a closed position is also shown which closes a connection socket for a charging cable, for example, a USB cable, particularly a micro-USB cable.

After the avalanche transceiver 10 is activated, the avalanche transceiver 10, which is particularly in the transmission mode (cf. FIG. 1), can be placed in a standby mode by actuating the button 36. Said actuating of the button 36 is also evaluated by the control device 24. Subsequently, the loudspeaker 22 can output a voice message, such as "Standby activated." By actuating the button 36, it is also possible to activate a group check mode, in which all avalanche transceivers 10, 32 of participants of a group, which, for example, begins a ski trip, are tested, whether they transmit faultlessly. Once again, the control device 24 can control the loudspeaker 22, and so the loudspeaker 22 outputs a voice message, such as "Group check activated."

Figure 5:
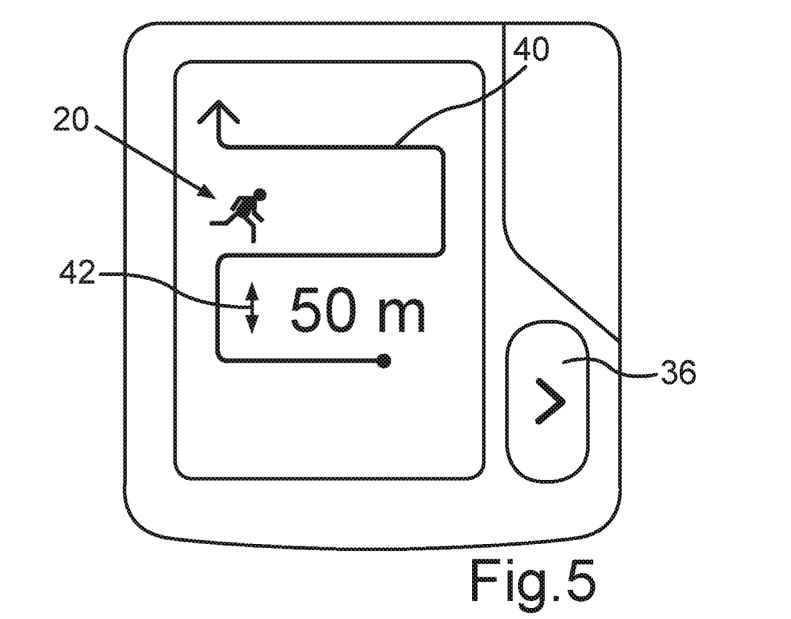
FIG. 5 shows the avalanche transceiver according to FIG. 2, wherein a display of the transceiver shows an indication to conduct a signal search and for that purpose to comb an avalanche cone in search strips.

When the avalanche transceiver 10 is in the search mode (cf. FIG. 2), the transmitting and receiving unit 16 initially searches for transmit signals from transmitting transceivers 32 with corresponding sensitivity in order to also detect transmitting transceivers 32 located further away. FIG. 5 shows the display 20 of the searching transceiver 10 (cf. FIG. 2) in a situation, in which an indication or a depiction on the display 20 indicates to the user of the searching transceiver 10 that said user is supposed to comb the avalanche cone in a specific pattern. For this signal search, a search strip 42, i.e., a distance between two search paths running in opposite directions, can, for example, be 50 meters. The width of the recommended search strip 42 can be indicated on the display 20, for example, in meters. The control device 24 controls the display 20 to display the depiction 40.

Simultaneously, the control device 24 can control the loudspeaker 22, and so said loudspeaker 22 outputs a voice message or a command, such as "Run in 50 meter search strips" or "Run in 50 meter search strips and be on the lookout." If, for example, after 2 to 6 seconds, particularly after 3 seconds, of a signal search, it is determined that the surroundings of the searching transceiver 10 is not sufficiently free of sources of interference (and the transmit signal 30 of the transmitting transceiver 32 has not yet been detected with sufficiently high quality), the display 20 can display a search strip 42 with reduced search strip width. In addition, the loudspeaker 22 can output the voice message that the transceiver 10 now searches with a reduced range, and that the user of the searching transceiver 10, i.e. the transceiver 10 which is in the search mode, is supposed to move in correspondingly narrower search strips 42 over the avalanche cone.

Figure 6:
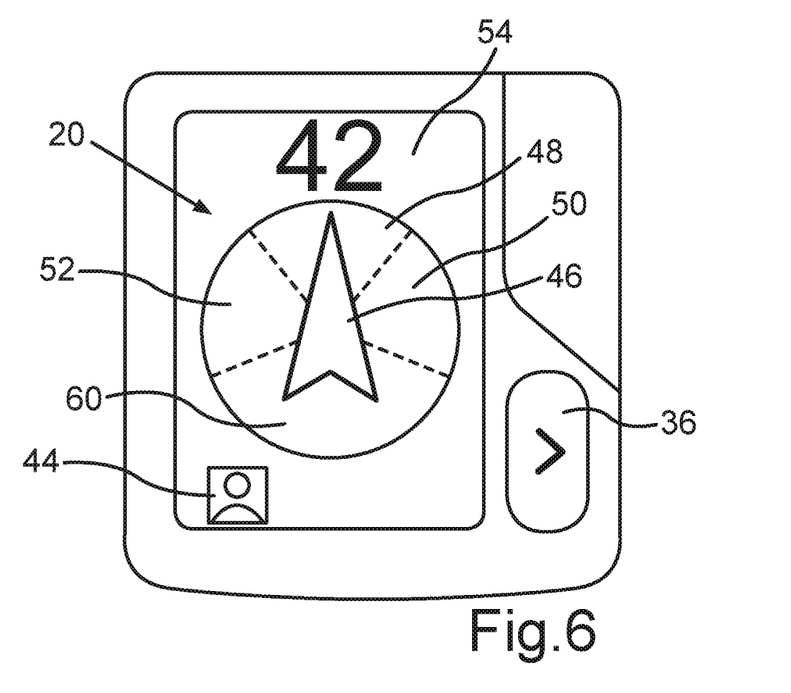
FIG. 6 shows the display of the transceiver after a transmitter was detected.

According to the depiction of the display 20 in FIG. 6, the received transmit signal 30 meets the criteria for a stable target guidance. It is thus possible to now transition from the signal search to the coarse search or even to the fine search. It is possible to indicate to the user of the transceiver 10 on the display the detection or localization of a transmitter or the transmitting transceiver 32 by depicting a symbol 44. For that purpose, the loudspeaker 22 can output a voice message, such as "Transmitter detected." Simultaneously, an arrow 46 indicates the direction in which the user of the searching transceiver 10 is supposed to run.

If the arrow 46 is in a first direction sector 48, the voice message that the user of the transceiver 10 is supposed to run straight ahead can simultaneously be output by the loudspeaker 22. Proceeding from a straight direction of the arrow 46, which with a horizontally held transceiver 10 points forward and thus straight ahead, the first direction sector 48 can extend up to approximately 40 degrees clockwise and −40 degrees counterclockwise. The degree specifications refer to a 12 o'clock position of the arrow 46, in which the arrow 46 points exactly straight ahead. However, if the arrow 46 points in a direction, in which the arrow 46 is associated with a second direction sector 50, the loudspeaker 22 can output a voice message, such as "Run to the right." Correspondingly, the second direction sector 50 can extend from 41 degrees clockwise to, for example, 110 degrees clockwise. However, if the arrow 46 is associated with a third direction sector 52, the loudspeaker 22 can output the voice message or the command "Run to the left." The third direction sector 52 extends, for example, from −41 degrees counterclockwise to approximately −110 degrees counterclockwise. If the arrow 46 is associated with a fourth direction sector 60, which borders on the second direction sector 50 and the third direction sector 52, the loudspeaker 22 can output the voice message or the command "Run back."

In an area 54 of the display 20, an estimated distance of the searching transceiver 10 from the transmitting transceiver 32 can also be displayed, e.g. with numbers indicating the distance in meters, for example. The arrow 46 and the specification of the distance in the area 54 are examples for indications for the search for the transmitting transceiver 32 which can be displayed on the display 20.

Figure 7:
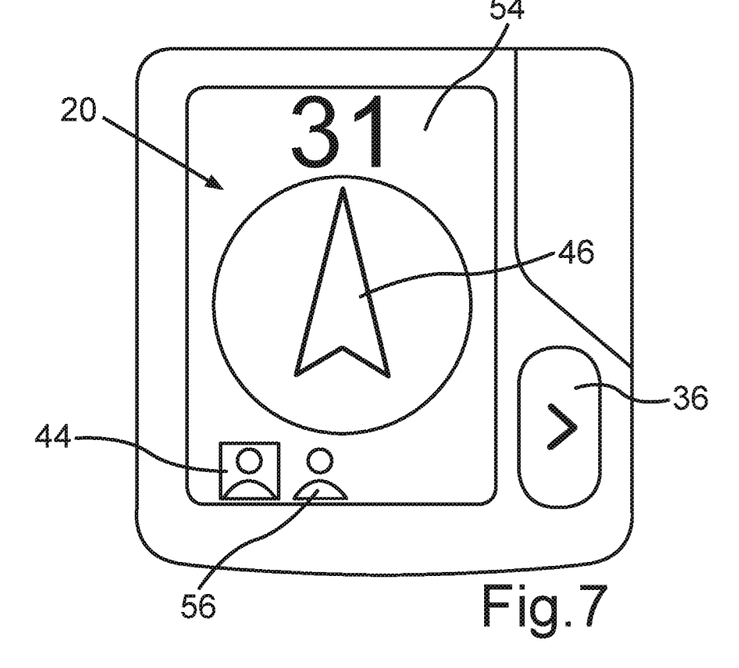
FIG. 7 shows the display of the transceiver during a coarse search for the detected transmitter, wherein a further transmitter, i.e. a further transmitting transceiver, was localized.

FIG. 7 shows a situation, in which the arrow 46 continues to essentially point straight ahead, but the distance of the searching transceiver 10 to the transmitting transceiver 32 is shorter. In addition, the display 20 shows a further symbol 56 which indicates that the transmitting and receiving unit 16 has detected a further transmitter, i.e., a further transmitting transceiver. However, the transceiver 10, which is in search mode, continues to guide the searching person to the closest transmitter which is represented by the symbol 44. It is possible that the transmit signals 30 of two transmitting transceivers 32 overlap, and so the transmit signals 30 cancel each other out. In such case, the symbols 44, 56, which represent the transmitters, can be displayed in a different display format than in the case of no signal overlap. Furthermore, the loudspeaker 22 can subsequently output a voice message, such as "Signal overlap. Keep running."

Figure 8:
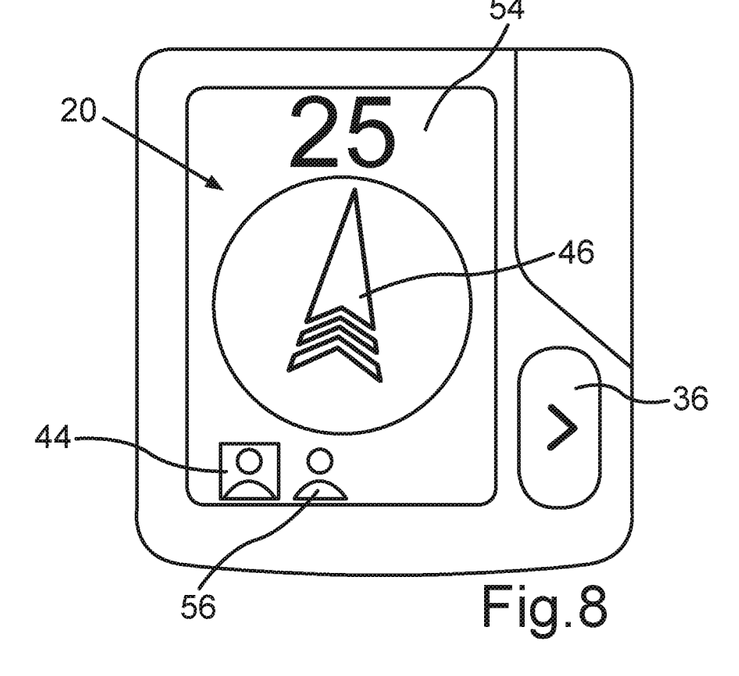
FIG. 8 shows the display of the transceiver, wherein a change to a direct search is displayed.

According to FIG. 8, the control device 24 can effect a changed depiction of the arrow 46 if there is a change from the coarse search, in which the transmitting transceiver 32 is associated with one of the three direction sectors 48, 50, 52, to a direct search. Simultaneously with the changed depiction of the arrow 46, a voice message can be output by means of the loudspeaker 22, e.g., "Direct search active." In the direct search, the control device 24 of the searching transceiver 10 has calculated a direct search path to the transmitter or transmitting transceiver 32. For that purpose, the transmitting transceiver 32 transmits to the searching transceiver 10 on at least one further frequency further data, e.g. about the orientation of the transmitting antennas of the transmitting transceiver 32. Based on such position data, the searching transceiver 10 can guide the searching person on a direct and shortest path to the transmitting or buried transceiver 32.

Figure 9:
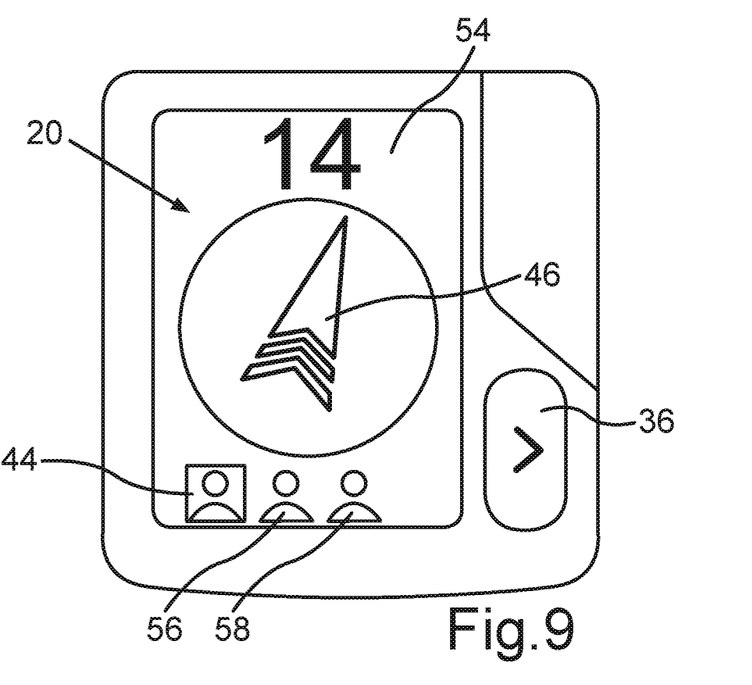
FIG. 9 shows the display of the transceiver, wherein the localizing of a further transmitting transceiver or transmitter during the direct search is shown.

FIG. 9 illustrates a situation, in which a further transmitter was detected during the direct search. A corresponding further symbol 58 is shown on the display 20. In addition, the distance from the searching transceiver 10 to the transmitting transceiver 32 has become shorter still. Preferably, the searching person is supposed to approach the buried person up to a distance of approximately 10 meters as quickly as possible, i.e., move as quickly as possible. At a distance between the searching transceiver 10 and the transmitting transceiver 32 of less than 10 meters, the searching person is supposed to move preferably at walking speed. As a result, the search direction should be exactly correct.

If the user of the searching transceiver 10 moves too fast, a voice message, such as "Walk slower," can be output by the loudspeaker 22. If, for example, the field intensity equivalents of the transmit signal 30 of the threshold values are exceeded at a distance of 11 meters and 8 meters between the searching transceiver 10 and the transmitting transceiver 32 in less than 3 seconds, then this can be used as the trigger for the outputting of the voice message. Analogously, a voice message, such as "Walk faster" can be output by means of the loudspeaker 22 if the user of the searching transceiver 10 moves too slowly.

The transmitting transceiver 32 outputs the transmit signal 30 at a specific frequency, for example at a frequency of one transmit pulse per second. It can be provided that the search direction is supposed to be corrected, when a transmit pulse, which originates from a direction of 25 degrees to 110 degrees clockwise in terms of the 12 o'clock direction, is detected four times consecutively by the transmitting and receiving unit 16 of the searching transceiver 10. For example, the loudspeaker 22 can subsequently output a message, such as "Keep to the right." Analogously, a command, such as "Keep to the left," can be output by means of the loudspeaker 22, for example, at the fourth consecutive measuring of a transmit pulse from a direction of −25 degrees to −110 degrees counterclockwise.

A 180-degree direction error, in which the user of the searching transceiver 10 moves away from the transmitting transceiver 32, can be assumed, when, for example, over two to six, particularly five, consecutive pulses of the transmit signal 30, the field intensity detected by the transmitting and receiving unit 16 of the searching transceiver 10 decreases by a predefined extent or beyond a specific level. The user of the searching transceiver 10 can subsequently be prompted to turn around, e.g. by means of a voice message, such as "You are moving away. Turn around."

If the user of the searching transceiver 10 is located at a distance of, for example, less than 6 meters from the transmitting transceiver 32, the loudspeaker 22 can be controlled by the control device 24 to output a voice message, such as "Go down to the snow surface." The searching transceiver 10 should subsequently be moved close to the snow surface over the avalanche cone.

Figure 10:
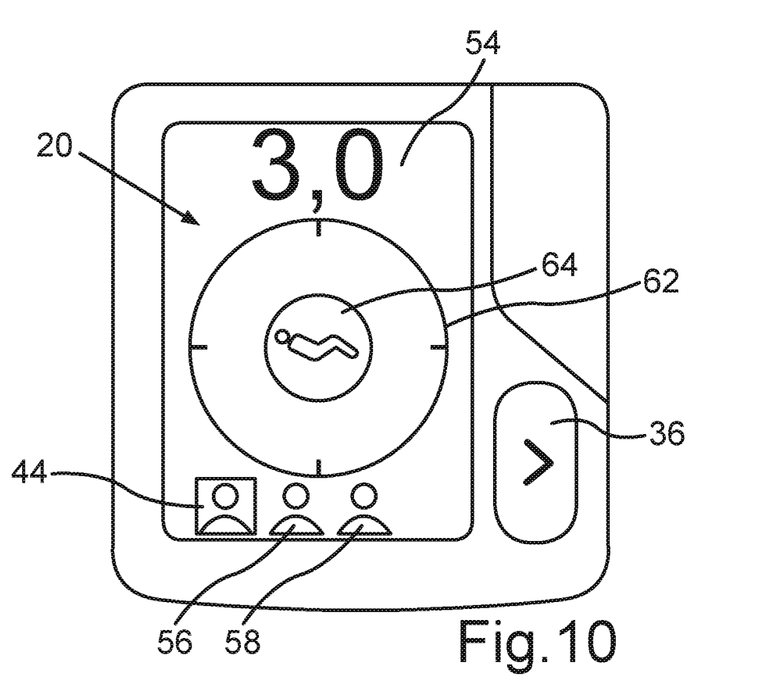
FIG. 10 shows the displaying of an indication on the display of the transceiver that a fine search in a cross pattern is supposed to be conducted.

FIG. 10 illustrates the transition from the coarse search to the fine search. This, for example, can take place at a distance of 3 meters or 2.5 meters between the searching transceiver 10 and the transmitting transceiver 32. The arrow 46 disappears from the display 20, and instead, a further symbol 64 is displayed within a circle 62, which represents the buried person to be searched. If the predefined distance of, e.g., 3 meters is undershot, the loudspeaker 22 can prompt the user of the searching transceiver 10 to conduct the fine search in a cross pattern, e.g., with a voice message, such as "Search for the smallest value in a cross pattern." For that purpose, the user of the searching transceiver 10 guides the transceiver 10 over the snow surface in a cross pattern, until the lowest value of the distance is displayed in the direction of the corresponding end points of the cross. If the distance to the transmitting transceiver 32 increases once again by a predefined extent during this fine search, it can be communicated to the user of the searching transceiver 10 via the loudspeaker 22, e.g., by means of a voice message, such as "You have already been closer."

Figure 11:
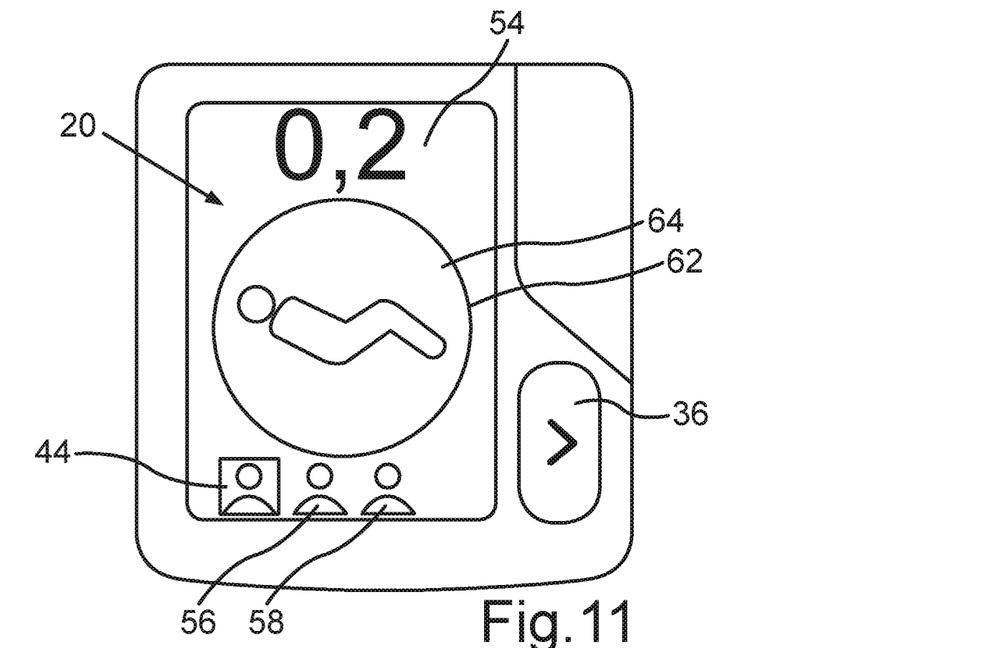
FIG. 11 shows the displaying on the display of the transceiver that the transmitting transceiver was exactly localized by means of the fine search.

FIG. 11 illustrates the situation, in which the exact localization of the buried person represented by the symbol 44 is displayed. Correspondingly, the symbol 64 fills up the circle 62 entirely.

Figure 12:
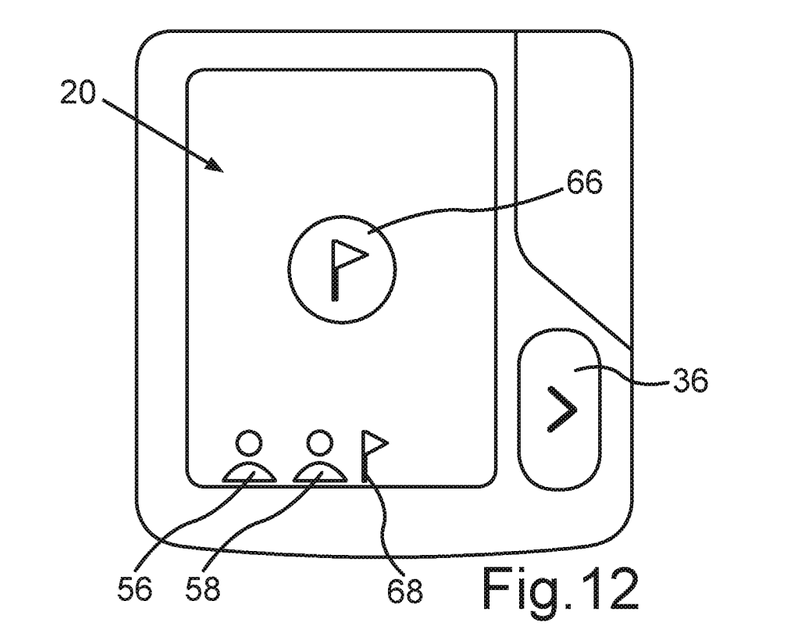
FIG. 12 shows the display of the transceiver, wherein the marking of the localized transmitter or localized transceiver is shown.

The control device 24 can be signaled, e.g. by actuating the button 36, that the exactly localized transmitter represented by the symbol 44 is now marked, and the sounding or uncovering of the buried person can commence. This can be communicated to the user of the searching transceiver 10 by outputting a voice message by means of the loudspeaker 22, such as, "Transmitter marked." Correspondingly, a marking symbol 66 can be displayed on the display 20 in accordance with the situation illustrated in FIG. 12. The detected or marked transmitter is also represented by a little flag 68, or the like, preferably in an area, in which the detected transmitters are displayed by the symbols 44, 56, 58 (cf. FIG. 11).

Figure 13:
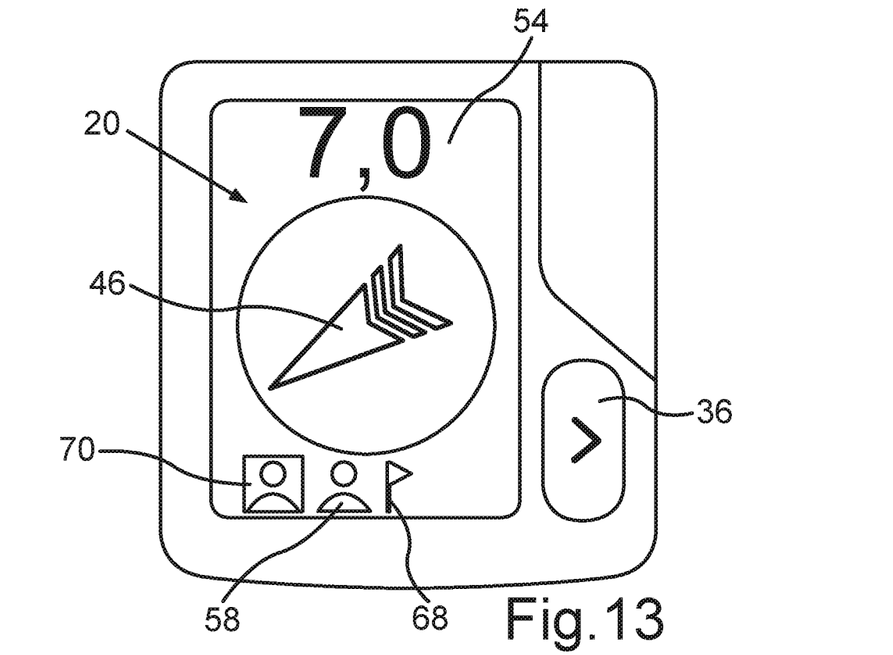
FIG. 13 shows the display of the transceiver, wherein a search direction to a further one of the detected transmitters is displayed.

According to FIG. 13, the transmitter search for a further nearest transmitter, indicated in FIG. 13 by the symbol 56, subsequently begins. The corresponding transmitter can be illustrated by a changed symbol 70 in the area of the display, in which the transmitter is displayed. The arrow 46 guides the user of the searching transceiver 10 to said further transmitter or further transmitting transceiver 32 (cf. FIG. 2).

Figure 14:
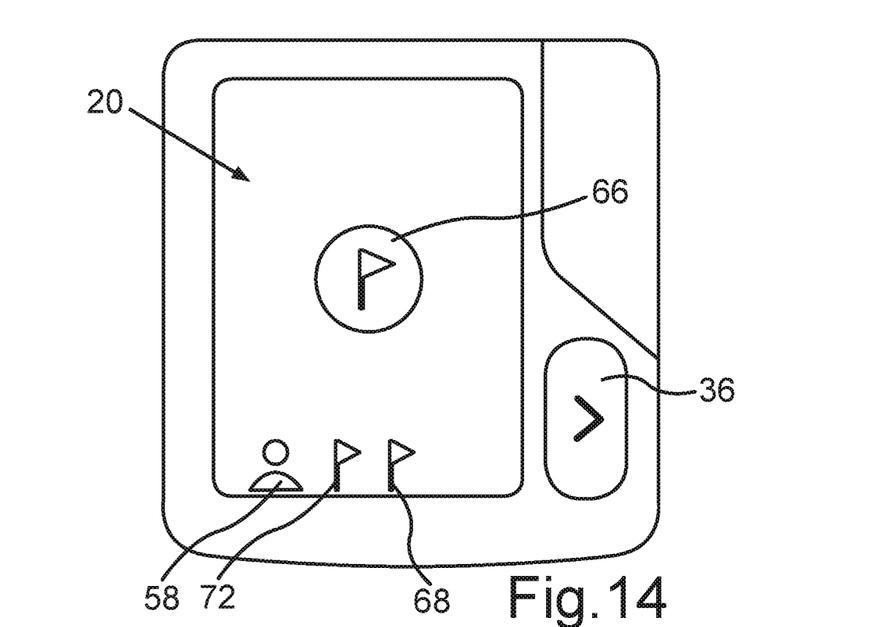
FIG. 14 shows the display of the transceiver, wherein the marking of the further transmitter is shown after its exact localization.
Figure 15:
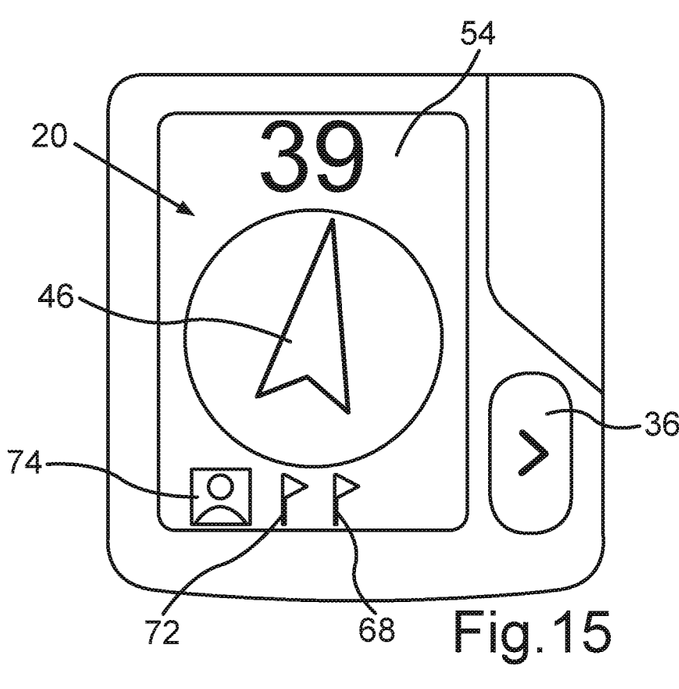
FIG. 15 shows the display of the transceiver, wherein a further transmitter was detected such that a stable target guidance to said further transmitter is possible.

After the further buried person is found and the transmitter is marked, a further little flag 72 instead of the symbol 70 (cf. FIG. 13) can be shown on the display 20 in accordance with FIG. 14. Then, according to FIG. 15, the target guidance begins to the remaining further transmitter which can be displayed next to the little flags 68, 72 as changed symbol 74. The arrow 46 indicates the search direction to this further transmitting transceiver 32 (cf. FIG. 2).

It can be provided that the loudspeaker 22 outputs a voice message, such as "Next transmitter. Run straight ahead" each time, when, after the marking of one transmitter, the search begins for the next closest buried person who carries the transmitting transceiver 32. Depending on the search direction to be selected, a voice message, such as "Next transmitter. Run to the left," "Next transmitter. Run to the right," or "Next transmitter. Run back," can also be output by the loudspeaker 22.

The middle piece 16 is also referred to as the central component of the shoulder straps and ensures at the same time that the end sections of the shoulder straps 12, 14 are connected with each other. The middle piece 16 comprises a plate-type base 24 (cf. FIG. 6), which can be provided, for example, by at least one substantially rectangular plate from a plastic such as polyethylene. On this plate-type base 24 are the pads 26, 28 shown in FIG. 1, which lie against the back of a user of the rucksack 10 in the region of the shoulder blades (or respectively in the region of the upper back), when the user wears the rucksack 10.

The middle piece 16 is, in this case, attached to a strap 30, of which the first layer 32 that faces the back of the user is shown in FIG. 1. The strap 30, however, has a second layer 34 as well, which is shown in FIG. 2 and which is covered in FIG. 1 by the first layer 32. This second layer 34 of the strap 30 is located between the first layer 32 and a back part 36 of the rucksack 10. In the embodiment of the rucksack 10 shown here, the free ends 38, 40 of the strap 30 are configured as loops (cf. FIG. 2). The free ends 38, 40 can be coupled with each other, for example by means of a U-shaped hook 42 in a manner that permits the transfer of a tensile force. This coupling of the two free ends 38, 40 of the strap 30 with each other provides a closed, or respectively revolving strap 30 to which the middle piece 16 is attached.

The strap 30 is redirected on a first redirecting element in the form of a ring 44 and on a second redirecting element, which, in the embodiment of the rucksack 10 shown in FIG. 1, is formed as a ring as well. The two rings 44, 46 face each other when looking at them from the vertical direction 22 of the rucksack 10. Here, the top ring 44 is arranged, for example, in the upper region of the back part 36, i.e. below a head cavity 48 of the rucksack 10. The bottom ring 46, or respectively the bottom redirection element is, however, in the embodiment of the rucksack 10 shown in FIG. 1, arranged above a central lumbar pad 50 in the region of a hip belt 52 of the rucksack 10. The strap 30 formed as a closed loop by the coupling of the free ends 38, 40 with each other, runs through these redirection elements in the form of the rings 44, 46, when the middle piece 16 is adjusted along the guide rails 18, 20. This redirecting process can be carried out with minimal friction, so that the continuous adjustment of the back length of the rucksack 10 can be carried out with great ease of use.

FIG. 2 shows that, when using the hook 42 to couple the free ends 38, 40 of the strap 30, forced as loops, with each other, the respective sides 54, 56 of the U-shaped hook 42 can enter through the loops. There, where the sides 54, 56 exit from the loops, a fastening element is provided in the form of a fastening ring 58 from metal, which holds the ends of the two sides 54, 56 together. The fastening ring 58, may, for example, be guided through an opening, which is formed in the side 56, and be held on the other side 54 in a take-up device.

It is also possible, however, to couple the two free ends 38, 40 of the strap 30 by means of a buckle 60, which is shown in FIG. 3, and which permits the transfer of the tensile force. Such a buckle element can be formed in particular in the manner of a frame, in which side portions 62 of the frame can be coupled with each other through a bar 64. The free end 38, can, for example, be fastened to the buckle 60, which is formed here as a three-bar buckle 60, in particular by means of sewing, and the free end 40 can be threaded into the buckle 60. The two free ends 38, 40 can also, however, be fastened to the buckle 60 or threaded into the buckle 60. It is furthermore feasible to couple the free ends 38, 40 of the strap 30 by means of a belt buckle or key lock in a destruction-free and detachable manner. A ring may also be used as a coupling element to transfer the tensile force, said ring (formed preferably in a rectangular shape) having an opening to hang the free ends 38, 40 of the strap 30 formed as closed loops. The ring, in particular a rectangular ring, or, respectively, bars forming frames may be formed in a rectangular, in particular square, shape in the cross section.

Furthermore, it may be provided that the two free ends 38, 40 of the strap 30 are coupled with each other by means of a Velcro fastener. A coupling point formed by the Velcro fastener, where the two free ends 38, 40 of the strap 30 are connected with each other in a manner that permits the transfer of the tensile force, or respectively a coupling element, for example in the form of the hook 42 or the buckle 60, therefore move upward or downward when the back length of the rucksack 10 is continuously adjusted in the vertical direction 22 of the rucksack 10.

Figure 4:
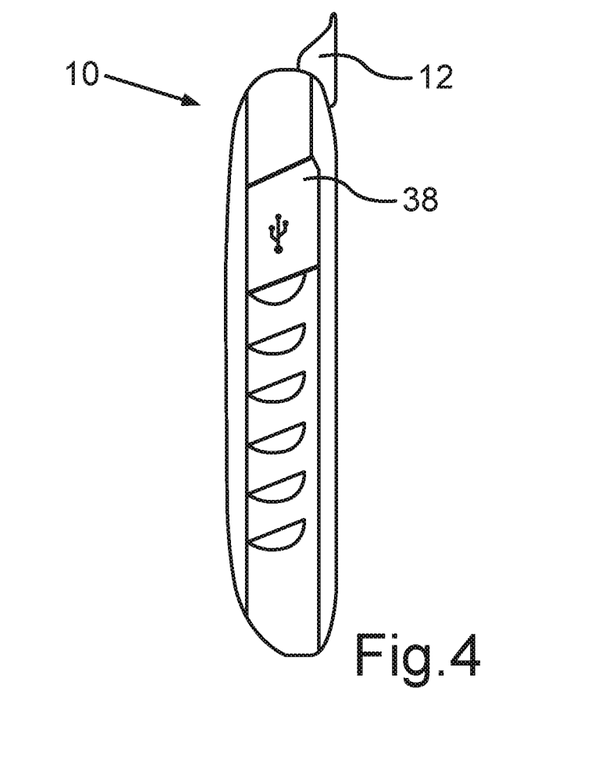
FIG. 4 shows a side view of the avalanche transceiver according to FIG. 2.

In particular the redirecting element that, when viewed from the vertical direction 22 of the rucksack 10, is the bottom element can be formed as a buckle element 66, which is shown as an example in FIG. 4. The buckle element 66 comprises, for example, a bar 68, around which the strap 30 is placed, or, respectively, on which the strap 30 is redirected and thus forms the two players 32, 34. Another bar of the buckle element 66 is fastened to the back part 36 of the rucksack 10 by means of webbing 70.

In the embodiment of the redirecting element shown in FIG. 4, the buckle element 66 furthermore comprises an arresting device 72, which comprises a lever 74. The lever 74 is rotatable around an axis of rotation 76 and comprises teeth at the side facing the first layer 32. In FIG. 4, the lever 74 is shown in its lock position, in which the teeth are hooked into the first layer 32. This prevents the strap 30 from running freely around the redirecting elements.

If, however, the lever 74 is moved away from the back part 36, i.e. moved to its release position, the teeth no longer hook into the first layer 32 and the strap 30 can freely run around the redirecting elements, for example in the form of the bar 68 and the ring 44 (cf. FIG. 1). The lever 74 of the arresting device 72 can be held in the lock position in particular by means of a spring element.

In particular when viewed together with FIG. 5, it becomes clear that the lever 74 lies against a plate-type cover 78 in its lock position, through which a portion of the buckle element 66 is pressed against the back part 36 of the rucksack 10. The plate-like cover 78, which, in this case, has the form of a butterfly and therefore has wings arranged on both sides of the strap 30, ensures here that only the lever 74 is moved away from the back part 36 when the lever 74 is shifted to the release position.

FIG. 5 shows as well that the back part 36 of the rucksack 10 may be reinforced by additional plates 80, 82. The additional plates 80, 82 are provided in particular in a region of the back part 36 in which the middle piece 16 can be adjusted in the vertical direction 22. According to FIG. 5, the two guide rails 18, 20 are preferably arranged parallel in a first region 84, in which the middle piece 16 is moved during the continuous back length adjustment. The guide rails 18, 20 therefore have a constant distance 86 from each other in the first region 84. In contrast, the guide rails 18, 20 are less far apart from each other in a second region, i.e. in this case in the region of the hip belt 52. Accordingly, the guide rails 18, 20 show a curve on the level of the back part 36. Furthermore, the guide rails 18, 20 are curved preferably vertical to the level of the back part 36. Thus, the guide rails 18, 20 are arranged closer to the back of the user of the rucksack 10 in the region of the hip belt 52 than in the upper region 84.

FIG. 5 furthermore shows that the buckle element 66 (cf. FIG. 4) of which FIG. 5 only shows the lever 74, may be fastened to a first belt buckle part 88 by means of the webbing, which is coupled detachably with a second belt buckle part 90. The second belt buckle part 90 is attached once again here to the back part 36 of the rucksack by means of webbing 92. In this embodiment, it is particularly easy to replace the buckle element 66.

FIG. 6 shows that other, pocket-shaped, or respectively strip-shaped elements 94 may be provided in the region of the plate-type base 24 of the middle piece 16. These types of elements 94 may be provided to connect the shoulder straps 12, 14 to the middle piece 16 or respectively to connect the shoulder straps 12, 14 to the middle piece 16. Furthermore, such elements 94 may form a pocket for the plate-like base 24. The middle piece 16 may furthermore comprise tunnels 110 for the rails 18, 20 formed from mesh elements or the like. Furthermore, two mesh elements 96 attached to the middle piece 16 form the respective tunnels through which the first layer of the strap 30 is guided. In the region of the mesh elements 96, the first layer 32 of the strap 30 is sewn to the middle piece 16 or fastened to it in another suitable manner. The second layer 34 of the strap 30 may also be guided through the tunnels that are formed by the mesh elements 96. Preferably, however, the second layer 34 is located outside of the tunnel formed by the mesh elements 96, because this way, the two layers 32, 34 can be in opposing directions with minimal friction, when the middle piece 16 is moved along the guide rails 18, 20 in the vertical direction 22 of the rucksack 10.

FIG. 7 shows that preferably the ring 44, which serves as the upper redirecting element and which has a substantially rectangular form here, can be hidden by a cover in the form of a flap 98 or the like. In that case, the ring 44 is well protected and contact between the ring 44 with the neck or head of the user of the rucksack 10 is avoided.

FIG. 8 shows that pockets 100 may be provided in the region of the head cavity 48, which may be directly connected with a back plate 102 of the back part 36 of the rucksack 10 and into which the end sections of the guide rails 18, 20 are inserted. Furthermore, the guide rails 18, 20 can be guided through further feedthroughs or tunnels 104 to fasten their position on the back plate 102, which may also be directly connected to the back plate 102. Additional tunnels 106 or pockets may be provided in the area of the lumbar pads 50. The other end sections of the guide rails 18, 20, may, in particular, be inserted into these types of tunnels 106 or pockets, which are provided in the area of the lumbar pads. In particular where the guide rails 18, 20 pass in the lumbar region, additional reinforcements, in particular in the form of plastic plates and the like, may be provided. Furthermore, reinforcing plates may be provided where the ring 44 is attached, in order to provide a particularly good mounting for the ring 44.

According to FIG. 1, an arrow point 112 is preferably arranged on one side of the middle piece 16, which is schematically shown in FIG. 9. Furthermore, tick marks 114 and/or symbols 116 may be provided on the back part 36 of the rucksack 10, which indicate the length for which the rucksack 10 was adjusted. The symbols 116 may be formed as the letters L, M, and S, for example, to indicate the back length.

The back length adjustment of the rucksack 10 may be provided in particular in a region which is delimited here by the tick marks 114, which are assigned to the symbols 116 L and S. This adjustment range between the tick marks 114 on the symbols 116 in the form of the letters L and S can have a length between approximately 8 cm and approximately 20 cm in the vertical direction 22 of the rucksack 10. The length of the adjustment range may be, for example, between approximately 10 cm and approximately 16 cm. The length of the adjustment range, or respectively a distance between the tick marks 114, to which here the symbol 116 in the form of the letter L on the one hand and the symbol 116 in the form of the letter S are arranged on the other hand, may amount to approximately 12 cm.

Through a respective placement of the coupling element to couple the two free ends 38, 40 with each other, for example in the form of the U-shaped hook 42 (cf. FIG. 2) it is possible to ensure that such a coupling element cannot be seen either in the highest position of the middle piece 16 or the lowest position of the middle piece 16, because in the respective positions, the coupling element can be covered by a pad 118 of the rucksack 10 (cf. FIG. 1), for example in the region of the kidneys, or, respectively, by the middle piece 16.

What is claimed is:

1. An avalanche transceiver, comprising
a transmitting unit for transmitting at least one transmit signal,
a receiving unit for receiving at least one transmit signal from at least one further avalanche transceiver,
at least one loudspeaker configured to output at least one voice message on the basis of at least one event associated with a search for the at least one further avalanche transceiver, and wherein the at least one loudspeaker is configured to output at least one audio signal associated with the search for the at least one further avalanche transceiver, and
a control device for controlling the at least one loudspeaker and configured to cause the at least one loudspeaker to output the at least one voice message on the basis of the at least one event, wherein the control device is configured to control the at least one loudspeaker to suppress or output with a reduced volume the at least one audio signal when the at least one voice message is output.

2. The avalanche transceiver according to claim 1, wherein the control device is auses the at least one loudspeaker to output the at least one voice message when the receiving unit detects a change of a received strength and/or a received quality of the at least one transmit signal of the further avalanche transceiver and/or detects a change of a direction, from which the transmit signal of the further avalanche transceiver originates.

3. The avalanche transceiver according to claim 1 or 2, wherein the control device is configured to calculate an estimated distance from the further avalanche transceiver by evaluating the transmit signal received by the receiving unit, and to subsequently control the at least one loudspeaker to output the at least one voice message, when the distance is shorter or an increase of the distance is greater than a predefined threshold value.

4. The avalanche transceiver according to claim 1, wherein the control device, by evaluating the transmit signal received by the receiving unit, is configured to calculate an estimated speed, with which a distance from the further avalanche transceiver changes, and to subsequently control the at least one loudspeaker to output the at least one voice message, when the estimated speed is greater than a predefined first threshold value, or lower than a predefined second threshold value.

5. The avalanche transceiver according to claim 1, wherein the control device is configured to take into account as the at least one event, whether the further avalanche transceiver can be located using the transmit signal received by the receiving unit.

6. The avalanche transceiver according to claim 1, wherein the control device is configured to take into account as the at least one event, whether the avalanche transceiver is set in a search mode or a mode different from the search mode.

7. The avalanche transceiver according to claim 1, wherein the control device is configured to cause the at least one loudspeaker to output the at least one voice message if, over a predefined number of successive transmit signals of the further avalanche transceiver, a search direction selected by a user of the avalanche transceiver deviates by more than a predefined extent from a search direction to be selected, and/or a received strength of the transmit signal of the further avalanche transceiver decreases by more than a predefined extent.

8. The avalanche transceiver according to claim 1, wherein the control device is configured to take into account as the at least one event at least one operating entry of a user of the avalanche transceiver and/or a handling of the avalanche transceiver by the user.

9. The avalanche transceiver according to claim 1, wherein the avalanche transceiver has a memory comprising computer executable instructions for a multiplicity of voice messages in a multiplicity of languages.

10. The avalanche transceiver according to claim 1, wherein the avalanche transceiver has a memory comprising computer executable instructions for a multiplicity of predetermined texts and a conversion device for converting a respective text into the at least one voice message to be output.

11. The avalanche transceiver according to claim 1, further comprising a display configured to display indications for the search for the at least one further avalanche transceiver, and wherein the at least one loudspeaker and/or the display are configured to be controlled by the control device.

12. The avalanche transceiver according to claim 11 wherein the control device is configured to control the display on the basis of the at least one voice message.

13. A method for operating an avalanche transceiver, comprising:
 providing an avalanche transceiver comprising
  a transmitting unit for transmitting at least one transmit signal, and
  a receiving unit for receiving at least one transmit signal output from at least one further avalanche transceiver,
  at least one loudspeaker, and
  a control device configured to control the at least one loudspeaker;
 receiving information to the avalanche transceiver from the at least one further avalanche transceiver;
 outputting at least one voice message by the at least one loudspeaker, based on the at least one event associated with a search for the at least one further avalanche transceiver;
 outputting at least one audio signal by the at least one loudspeaker, the at least one audio signal associated with the search for the at least one further avalanche transceiver; and
 suppressing or reducing a volume of the at least one audio signal when the at least one voice message is output.

14. The avalanche transceiver according to claim 12, wherein the control device is configured display at least one indication for the search on a display on the basis of the at least one voice message to determine the output of the at least one voice message by the at least one loudspeaker in a predefined temporal relationship to displaying on the display.

15. The avalanche transceiver according to claim 14, wherein the at least one indication for the search for the at least one further avalanche transceiver is displayed on the display simultaneously to the output of the at least one voice message.

* * * * *